United States Patent [19]

Asano et al.

[11] Patent Number: 5,187,998
[45] Date of Patent: Feb. 23, 1993

[54] SHIFT LEVER FOR AUTOMATIC TRANSMISSION

[75] Inventors: Yasushi Asano; Norio Togano, both of Shizuoka, Japan

[73] Assignee: Fuji Kiko Co., Ltd., Japan

[21] Appl. No.: 671,112

[22] Filed: Mar. 18, 1991

[30] Foreign Application Priority Data

Mar. 22, 1990 [JP] Japan ................. 2-29244[U]

[51] Int. Cl.⁵ ............... B60K 20/00; G05G 1/04; F16H 21/44
[52] U.S. Cl. .......................... 74/523; 74/97.1; 74/538; 74/475
[58] Field of Search .......... 74/523, 538, 97.1, 473 R, 74/475

[56] References Cited

U.S. PATENT DOCUMENTS

| | | | |
|---|---|---|---|
| 3,071,010 | 1/1963 | Lupkas | 74/97.1 |
| 3,902,378 | 9/1975 | Osborn | 74/475 |
| 4,531,423 | 7/1985 | Fogelberg | 74/475 |
| 4,741,477 | 5/1988 | Ito | 74/97.1 X |
| 4,932,283 | 6/1990 | Ishigami et al. | 74/523 X |
| 4,977,789 | 12/1990 | Osborn | 74/473 R |

FOREIGN PATENT DOCUMENTS

| | | | |
|---|---|---|---|
| 495074 | 8/1950 | Belgium | 74/97.1 |
| 60-195225 | 12/1985 | Japan | 74/523 |
| 0137032 | 6/1988 | Japan | 74/473 R |

Primary Examiner—Vinh T. Luong
Attorney, Agent, or Firm—Ronald P. Kananen

[57] ABSTRACT

In order to eliminate play between the elements of a shift mechanism wherein when a shift lever is moved toward control wire, the control wire is moved toward the shift lever and versa. A torsion spring which produces a force greater than the force which resists movement of the control wire or cable is disposed with a bell crank which interconnects the shift lever and the control wire and is arranged to bias a pin which forms part of the connection between the shift lever and the bell crank into constant engagement with a side of an elongate slot in which the pin is received and which slot forms part of the above mentioned connection.

2 Claims, 3 Drawing Sheets

SHIFT LEVER FOR AUTOMATIC TRANSMISSION

BACKGROUND OF THE INVENTION

1. Field of the Invention

The present invention relates generally to a shift lever for an automatic transmission and more specifically to a shift lever of the type which improves the shift feeling imparted to the person operating the same.

2. Description of the Prior Art

In the event that it is required to be able pull a control cable toward the shift lever when it is pushed forward (viz., in the direction of the cable), and vice versa, it is known to pivotally support the shift lever on the vehicle chassis and connect the control cable to the end of the shift lever which is located below the axis about which the lever is pivotal. However, this requires that the shift lever be relatively long and to be mounted on the vehicle chassis in a manner wherein it projects downwardly toward the road and thus tends to reduce ground clearance.

JU-A-60-195225 discloses an example of a shift lever arrangement wherein, when the shift lever is pushed forward, the control cable is pulled toward the lever and vice versa. However, while this arrangement tends to reduce the above-mentioned ground clearance problem, as it requires a number of levers/links to be connected between the shift lever and the control cable in order to achieve the required reversing of the cable movement, the play and the like which inevitably occurs between the each of joints included in the linkage mechanism reduces the so-called shift feeling which is imparted to the person operating the shift lever.

SUMMARY OF THE INVENTION

It is an object of the present invention to provide a shift lever arrangement which does not excessively project downwardly toward the road when mounted on the vehicle chassis and which imparts a good shift feeling to the operator thereof.

In brief, the above object is achieved by an arrangement wherein, in order to eliminate play between the elements of a shift mechanism wherein, when a shift lever is moved toward the control wire, the control wire is moved toward the shift lever and vice versa, a torsion spring which produces a force greater than the force which resists movement of the control wire or cable, is disposed with a bell crank which interconnects the shift lever and the control wire. The spring is arranged to bias a pin which forms part of the connection between the shift lever and the bell crank into constant engagement with a side of an elongate slot in which the pin is received and which slot forms part of the above-mentioned connection.

More specifically, a first aspect of the present invention is provided a shift mechanism which features: a shift lever arrangement which is supported on a casing so as to be pivotal about a first axis, said shift lever arrangement having a pin which extends therefrom, a bell crank which is supported on the casing so as to be pivotal about a second axis, one end of the bell crank being adapted to be connected to a control wire, the other end of the bell crank being formed with an elongate slot in which the pin on the shift lever arrangement is slidably received; and resilient means for biasing the pin into constant engagement with a predetermined side of the elongate slot.

A second aspect of the present invention is provided a shift mechanism which features: a casing which is adapted for connection to a vehicle chassis; a shift lever arrangement which is supported on a casing so as to be pivotal about a first shaft, said shift lever arrangement having a pin which extends therefrom at a predetermined distance from a first axis about which the first shaft is pivotal; a bell crank which is supported on the casing so as to be pivotal about a second shaft, the second shaft being pivotal about a second axis which is located at a level higher than the first axis, one end of the bell crank being adapted to be connected to a control wire, the other end of the bell crank being formed with an elongate slot in which the pin on the shift lever arrangement is slidably received; and means for biasing the pin into constant engagement with a predetermined side of the elongate slot.

DETAILED DESCRIPTION OF THE PREFERRED EMBODIMENTS

Figure 1:
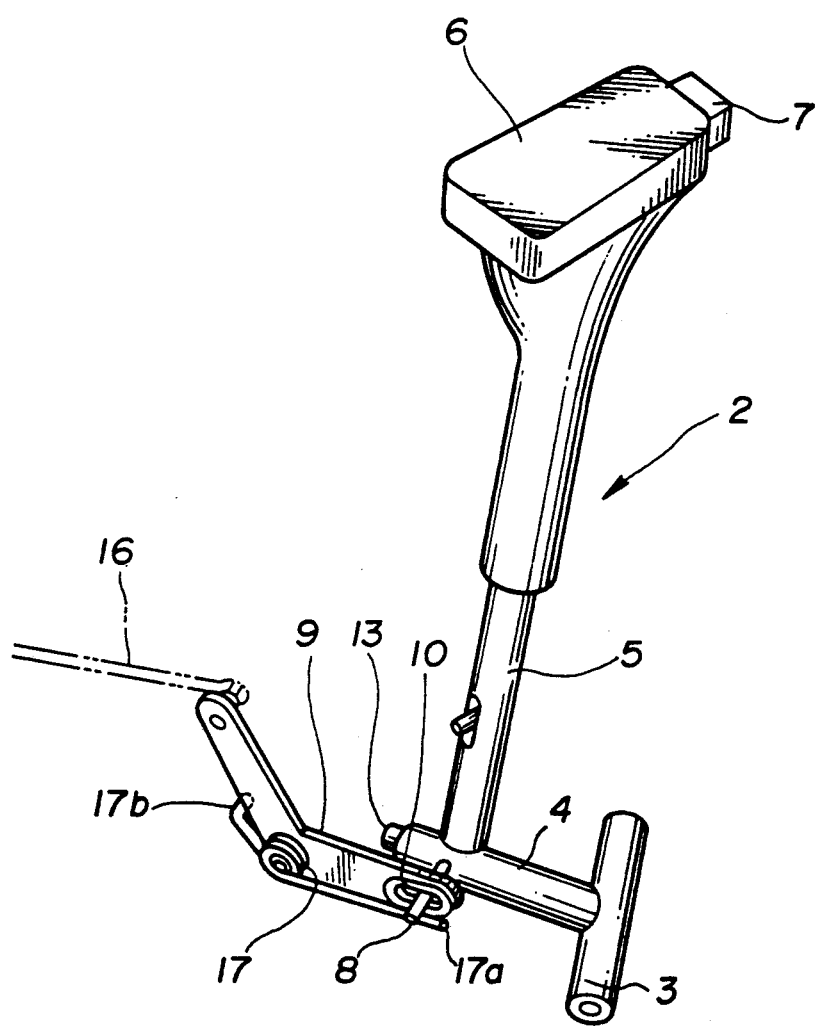
FIG. 1 is a perspective view showing the arrangement of the components of the shift lever arrangement which characterize the present invention.
Figure 2:
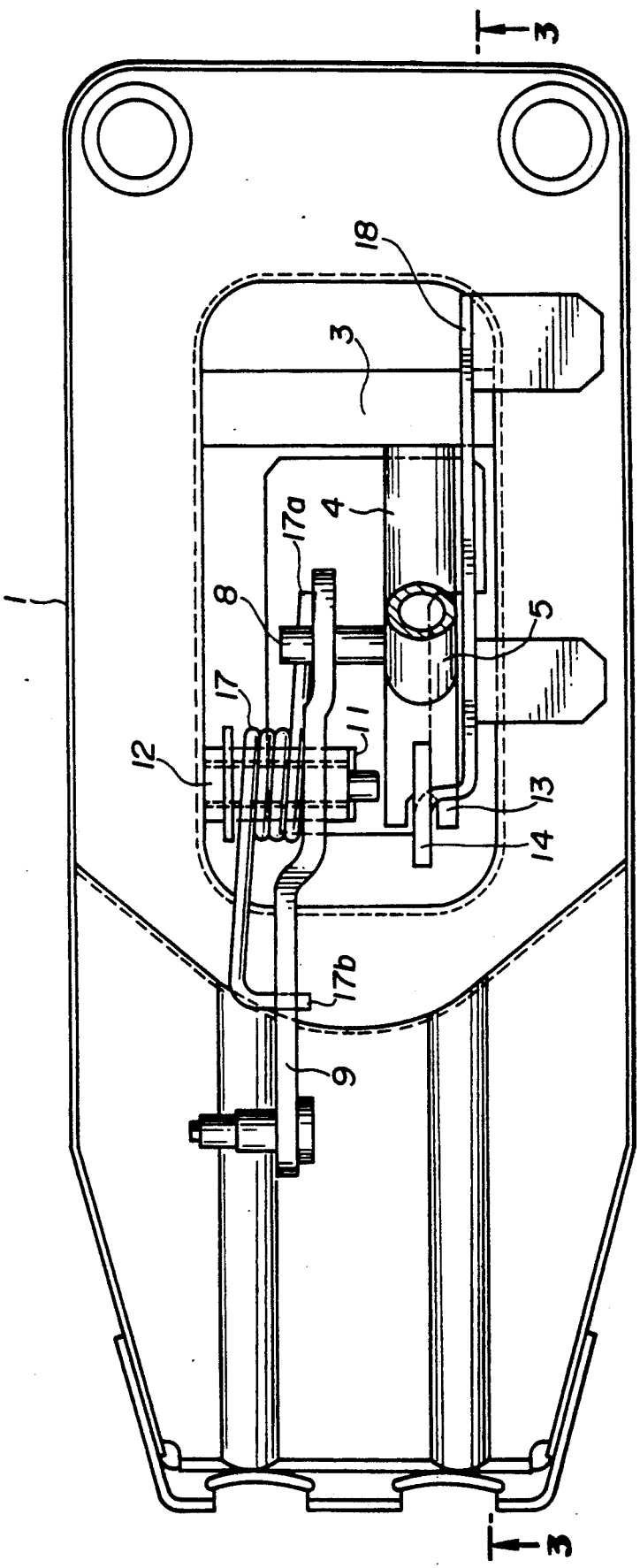
FIG. 2 is a plan view of a fully assembled embodiment of the present invention.
Figure 3:
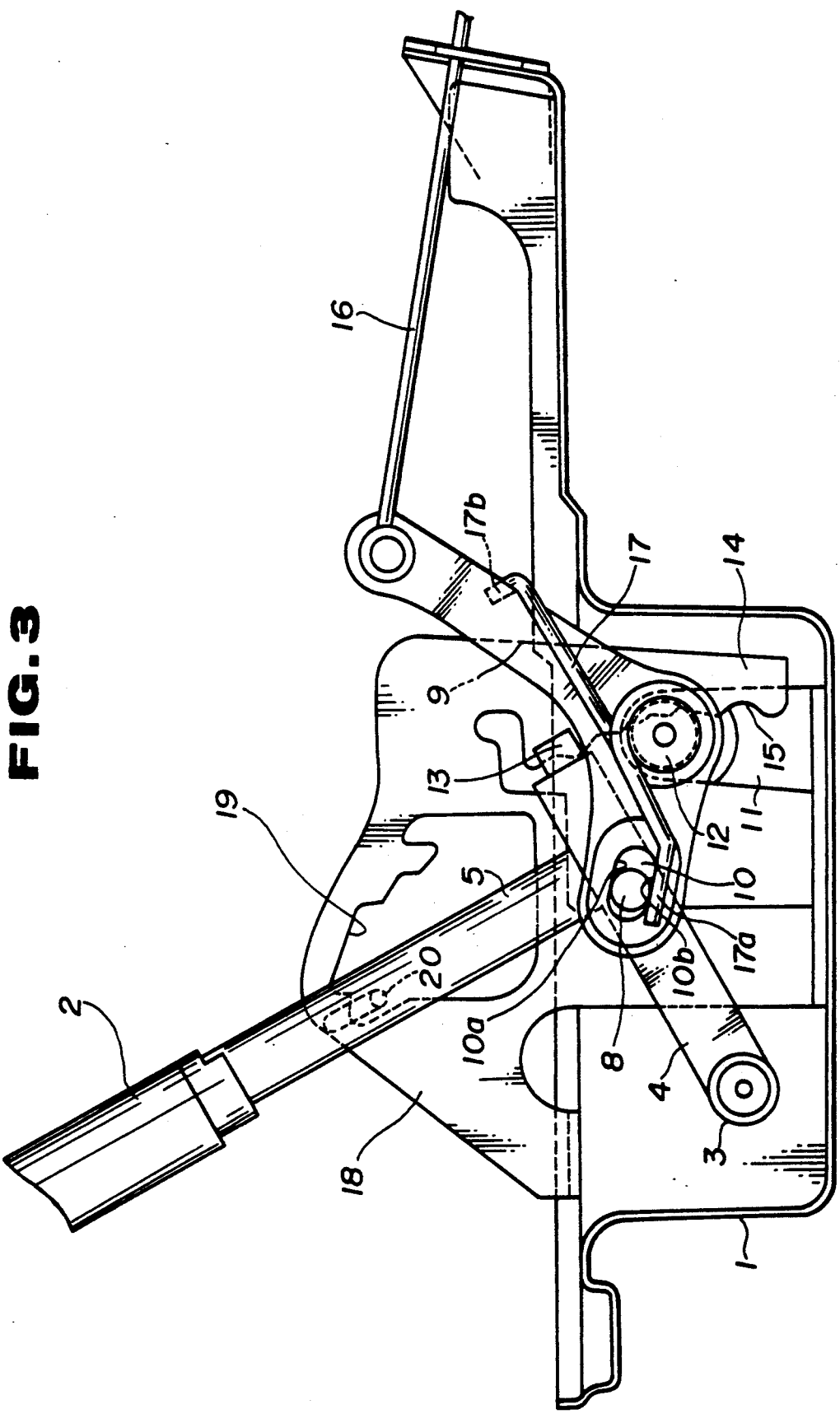
FIG. 3 is a sectional view as taken along section line 3—3 of FIG. 2.

FIGS. 1 to 3 show an embodiment of the present invention. This arrangement includes a casing 1 which is adapted to be fixedly connected to the floor panel of a vehicle chassis and a shift lever 2 which is pivotally supported thereon. In this embodiment the shift lever includes a shaft 3 which extends laterally across the casing 1 and which is pivotally supported thereon, a shaft 4 which is welded or otherwise fixedly connected to the shaft 3 and arranged to extend at right angles thereto, and a shaft 5 which is fixedly connected to the shaft 4 and arranged to extend at right angles thereto. In this arrangement the shaft 4 is arranged to act as a check holder, while shaft 5 is arranged to support a shift knob 6 at its upper end.

A pin 8 which extends out of one side of the check holder 4 (as it will be referred to hereinafter) provides an operative connection between the shift lever 2 and a bell-crank 9. The pin 8 is slidably received in an elongate slot 10 formed in one end of the bell-crank 9. The bell-crank 9 is pivotally supported on a bracket 11 which forms part of the casing 1 by way of a pivot shaft 12.

A check 13 is mounted on the end of the check holder 4 and arranged to engage a check plate 14 in which check recesses 15 are formed.

A control cable 16 is connected to the other end of the bell crank 9 in the illustrated manner. A torque spring 17 is has a coiled portion disposed about the shaft 12 and arranged so that one leg 17a engages the pin 8 while the other leg 17b is hooked about an edge of the bell crank 9 at a location between the shaft 12 and the end to which the control cable 16 is connected. This spring 17 is arranged to produce a force which is greater than the force which resists axial movement of the control cable 16.

A position plate 18 is formed with a detente aperture 19 which is so shaped as to cooperate with a position pin 20. As shown, the position pin 20 is carried on the shift lever 2 and is operatively connected with a manually operable button 7 incorporated into the shift lever knob 6. Upon depression of the button 7 the pin 20 is moved out of engagement with the recesses defined in the aperture 19.

It will be noted at this point that it is possible in order to reduce operating noise to omit the holder arrangement if so desired.

With the instant embodiment, as the shift lever 2 is pivotally supported on the casing 1 by way of shaft 3 (which defines first pivot axis) while the shaft 12 defines a second pivotal axis about which the bell crank 9 is pivotal, when the shift lever 2 is moved in one direction, the operative connection established between the shift lever 2 and the bell crank 9 by the connection provided by the pin 8 extending into the elongate slot 10 formed in the bell crank induces the control cable 16 to be moved in the opposite direction.

Even though the diameter of the pin 8 is less than the width of the slot 10, the provision of the torsion spring 17 is such as to bias the pin into constant engagement with the upper side wall 10$a$ of the slot and thus eliminate any clearance therebetween. As the force which is applied by the torsion spring 17 is greater than the force which must be overcome to push and pull the control cable 16, the pin 8 is maintained in engagement with the side wall 10$a$ of the slot 10 at all times. Thus, irrespective of the direction in which the shift lever 2 is moved, no clearance is developed between the pin 8 and the side wall 10$a$. viz., when the shift lever is moved from the position shown in FIG. 3 toward the cable 16, and the shaft 3 rotates clockwise as seen in the drawings, the bell crank 9 is induced to rotate in the counterclockwise direction about shaft 12. This induces the control cable to be pulled toward the shift mechanism. As mentioned above, as the torsion spring applies a force which is greater than the force which resists movement of the control cable, the pin 8 is maintained in constant engagement with the upper side 10$a$ of the slot 10 as it slides therealong. When the shift lever 2 is moved away from the cable and the shaft 3 pivots in the counterclockwise direction, the bell crank 9 is induced to rotate in the clockwise direction about the shaft 12 and pushes the control cable toward the un-illustrated transmission or like device to which it is connected.

With the above type of arrangement, essentially all the play in the mechanism is eliminated with the result that a smooth feeling of positive connection between the lever and the transmission is experienced by the operator.

What is claimed is:

1. A shift mechanism comprising:

a casing which is adapted for connection to a vehicle chassis;

a shift lever arrangement which is supported on the casing so as to be pivotal about a first shaft, said shift lever arrangement having a pin which extends therefrom at a predetermined distance from a first axis about which the first shaft is pivotal;

a bell crank which is supported on the casing so as to be pivotal about a second shaft, the second shaft being pivotal about a second axis which is located at a level higher than the first axis, one end of the bell crank being adapted to be connected to a control wire, the other end of the bell crank being formed with an elongate slot in which the pin on the shift lever arrangement is slidably received;

means for biasing the pin into constant engagement with a predetermined side of the elongate slot wherein said biasing means comprises a torsion spring, said torsion spring having a coiled portion which is disposed about the second shaft and first and second leg portions, the first leg portion engaging said pin and the second leg portion engaging the bell crank at a location between the second shaft and a location for connection of a control wire.

2. A shift mechanism comprising:

a shift lever arrangement which is supported on a casing so as to be pivotal about a first shaft, said shift lever arrangement having a pin which extends therefrom;

a bell crank which is supported on the casing so as to be pivotal about a second shaft, said bell crank including first and second end portions arranged opposite to each other with respect to the second shaft, the first end portion including an elongated opening into which the pin of the shift lever arrangement is inserted slidably to connect the bell crank to said shift lever arrangement so that said bell crank pivots with respect to the second shaft according to pivotal movement of said shift lever arrangement, moving the second end portion in a direction opposite a direction of the pivotal movement of said shift lever arrangement; and a torsion spring which includes a coiled portion disposed on the second shaft and first and second leg portions, the first leg portion engaging with the pin of said shift lever arrangement so as to bias the pin into constant engagement with a predetermined side of the elongated opening, the second leg portion being attached to a portion of said bell crank.

* * * * *